(12) United States Patent
Fowler (10) Patent No.: US 10,252,422 B2
(45) Date of Patent: Apr. 9, 2019

(54) APPARATUS FOR TRANSPORTING A ROTOR

(71) Applicant: Universal Balancing Limited, Bristol (GB)

(72) Inventor: Steve Fowler, Bristol (GB)

(73) Assignee: Universal Balancing Limited, Bristol (GB)

( * ) Notice: Subject to any disclaimer, the term of this patent is extended or adjusted under 35 U.S.C. 154(b) by 0 days.

(21) Appl. No.: 15/816,651

(22) Filed: Nov. 17, 2017

(65) Prior Publication Data

US 2018/0071916 A1 Mar. 15, 2018

Related U.S. Application Data

(63) Continuation of application No. 14/870,527, filed on Sep. 30, 2015, now Pat. No. 9,849,590, which is a (Continued)

(30) Foreign Application Priority Data

Aug. 13, 2013 (GB) .................................. 1314459.7

(51) Int. Cl.
*G01M 1/24* (2006.01)
*B25J 15/00* (2006.01)
(Continued)

(52) U.S. Cl.
CPC ........... *B25J 9/1679* (2013.01); *B25J 9/0084* (2013.01); *B25J 9/0096* (2013.01);
(Continued)

(58) Field of Classification Search
CPC .............................. G01M 1/24; B25J 15/0057
See application file for complete search history.

(56) References Cited

U.S. PATENT DOCUMENTS 4,590,578 A * 5/1986 Barto, Jr. ................. B21J 15/10
318/632
4,724,708 A 2/1988 Okano et al.
(Continued)

FOREIGN PATENT DOCUMENTS

GB 2478836 A 9/2011
GB 2515062 A 12/2014
(Continued)

OTHER PUBLICATIONS

Balancing Machines—Drive Shaft, Propshaft-Dynamic, Static Balancer, http://web.archive.org/web/20130731001133/http://www.universal-balancing.com, Jul. 31, 2013, pp. 1 to 3.
(Continued)

*Primary Examiner* — Thomas Randazzo
(74) *Attorney, Agent, or Firm* — Pillsbury Winthrop Shaw Pittman LLP (57) ABSTRACT

Provided is an apparatus capable of transporting a rotor from a first location to a second location, including: a holding device for engaging with a portion of the rotor at the first location so as to hold the rotor relative to the apparatus; a position determination device for determining the position of at least one component part of the rotor relative to another component part of the rotor or another body; a positioning device for positioning or repositioning said at least one component part of the rotor relative to another component part of the rotor or another body; and a movement device for moving the rotor from the first location to the second location. Also described is a method of loading a rotor into a balancing machine.

20 Claims, 9 Drawing Sheets

Related U.S. Application Data continuation of application No. PCT/GB2014/052055, filed on Jul. 7, 2014.

(51) Int. Cl.
*B25J 9/00* (2006.01)
*B25J 9/16* (2006.01)
*G01M 1/02* (2006.01)
*G01M 13/027* (2019.01)

(52) U.S. Cl.
CPC ............ *B25J 15/0057* (2013.01); *G01M 1/02* (2013.01); *G01M 1/24* (2013.01); *G01M 13/027* (2013.01); *G05B 2219/31041* (2013.01); *G05B 2219/37378* (2013.01); *G05B 2219/45083* (2013.01); *Y10S 901/02* (2013.01); *Y10S 901/06* (2013.01)

(56) References Cited

U.S. PATENT DOCUMENTS

| | | | |
|---|---|---|---|
| 5,175,914 A | 1/1993 | Mitsukuchi et al. | |
| 5,191,817 A | 3/1993 | Mitsukuchi et al. | |
| 5,321,874 A * | 6/1994 | Mills | B23Q 1/01 |
| | | | 198/346.1 |
| 5,380,978 A | 1/1995 | Pryor | |
| 5,576,496 A | 11/1996 | Carlini et al. | |
| 6,416,273 B1 * | 7/2002 | Herbermann | B21D 43/055 |
| | | | 414/749.1 |
| 6,923,058 B2 | 8/2005 | Nieman et al. | |
| 7,066,025 B1 * | 6/2006 | Corbin | G01M 1/24 |
| | | | 73/462 |
| 7,441,456 B1 | 10/2008 | Corbin et al. | |
| 8,056,410 B2 | 11/2011 | Sanchez et al. | |
| 9,849,590 B2 * | 12/2017 | Fowler | G01M 1/24 |
| 2003/0074151 A1 * | 4/2003 | Rapp | G01M 1/24 |
| | | | 702/105 |
| 2006/0130576 A1 | 6/2006 | Turner et al. | |
| 2007/0013199 A1 | 1/2007 | Hall et al. | |
| 2008/0141773 A1 * | 6/2008 | Rogalla | G01M 1/04 |
| | | | 73/461 |
| 2009/0014968 A1 * | 1/2009 | Dolp | B23B 31/19 |
| | | | 279/133 |
| 2010/0294038 A1 | 11/2010 | Sanchez et al. | |
| 2011/0197672 A1 | 8/2011 | Peinelt et al. | |
| 2013/0168516 A1 * | 7/2013 | Winter | F16M 13/022 |
| | | | 248/274.1 |
| 2013/0272833 A1 * | 10/2013 | Duncan | H01L 31/188 |
| | | | 414/737 |
| 2015/0246740 A1 * | 9/2015 | Boden | B25J 15/0616 |
| | | | 414/737 |
| 2016/0016316 A1 * | 1/2016 | Fowler | G01M 1/24 |
| | | | 700/213 |

FOREIGN PATENT DOCUMENTS

| | | |
|---|---|---|
| JP | S5612529 A | 2/1981 |
| JP | H11351199 A | 12/1999 |
| JP | 2002111592 A | 4/2002 |
| WO | 2011143175 A2 | 11/2011 |
| WO | 2014181102 A1 | 11/2014 |
| WO | 2014181103 A1 | 11/2014 |

OTHER PUBLICATIONS

Balancing Machines—Drive Shaft, Propshaft-Dynamic, Static Balancer, http://web.archive.org/web/20120818135820/http://www.universal-balancing.com, Aug. 18, 2012, pp. 1 to 3.

UK Search Report under Section 17 for GB application GB1314459.7, dated Mar. 28, 2014, pp. 1 to 1.

International Search Report and Written Opinion for PCT application PCT/GB2014/052055, dated Jun. 10, 2014, pp. 1 to 13.

* cited by examiner

APPARATUS FOR TRANSPORTING A ROTOR

CROSS-REFERENCE TO RELATED APPLICATIONS

The present application is a continuation of U.S. patent application Ser. No. 14/870,527, filed 30 Sep. 2015, which is a continuation of PCT Patent Application PCT/GB2014/052055, filed 7 Jul. 2014 with the United Kingdom Receiving Office, which is a PCT filing of, and claims the benefit of, Patent Application 1314459.7, filed 13 Aug. 2013 in the United Kingdom. Each listed parent application is hereby incorporated by reference in its entirety

BACKGROUND

Field

This invention relates to an apparatus for transporting a rotor such as, for example a propshaft. In particular, but not exclusively, the invention relates to an apparatus for transporting a rotor from a first location and loading the rotor into a balancing machine at a second location so that a balancing operation can be undertaken on the rotor. The invention also relates to a method of loading a rotor into such a balancing machine.

Description of the Related Art

Propshafts, and more generally rotors, can be formed of a single rotor portion or multiple rotor portions linked together in end-to-end alignment. Rotors formed of multiple rotor portions may comprise two or three such portions, and less commonly may comprise four portions. The rotor portions are often connected to each other in an articulated fashion, and often adjacent rotor portions can "plunge" relative to each (e.g. they can move axially relative to each other) and the articulate joints can sometimes plunge.

Balancing is typically carried out on rotors to overcome or lessen the problem of 'unbalance'—the uneven distribution of mass around the axis of rotation of the rotor. Unbalance is when the inertia axis of the rotor is offset from its central axis of rotation, which results from the mass of the rotor not being distributed uniformly about its central axis. Rotors suffering unbalance may generate a moment when rotating which leads to vibration.

It is known to balance a single piece rotor using two balance planes. Each balance plane is a plane disposed substantially perpendicular to the axis of the rotor. When balancing a multiple piece rotor, balancing is carried out in additional balance planes: a two piece rotor may be balanced in three planes, a three piece rotor may be balanced in four planes, and a four piece rotor may be balanced in five planes.

Correction for unbalance is typically carried out by welding balance weights to the rotor. Rotors are designed with zones where balance weights can be added corresponding to the number of balancing planes, which are usually near the end of each rotor portion.

The mechanism for correcting unbalance is typically automated, by which balance weights are attached (e.g. welded) to the rotor at a set position along the axis of the rotor for each plane, within specified balance zones. Once weights for all planes (where required) are applied to the rotor, the rotor unbalance is measured again using the same method. If the unbalance measured in any plane remains outside of a predefined tolerance threshold, a second step of correction is carried out within the corresponding balance zone.

To perform the balancing process a rotor is loaded into a balancing machine that includes an apparatus for driving the rotor. Each end of the rotor is located in a respective mounting apparatus that includes a chuck to secure that end of the rotor. The mounting apparatuses are driven by a drive mechanism so as to transfer torque to the rotor. The ends of the rotor typically include means for connecting the rotor to other components (in its end use), and those endmost connections are often articulated to the remaining component parts of the rotor. The endmost articulated connections often include an array of apertures (e.g. evenly spaced angularly around an axis of the rotor) through which fasteners pass when the rotor is installed in its end use. Due to the manufacturing process of such rotors, it is often the case that the apertures in the endmost articulated connection at one end of the rotor are not aligned with the apertures in the endmost connection at the opposite end of the rotor.

Currently the loading of the rotor into the balancing machine is a manual process. This means that when the rotor is loaded into a balancing machine it is necessary to align the apertures in the endmost connections with the respective mounting apparatus (which usually include one or more projections which are received in the apertures so as to provide a rotationally fast connection therebetween). This manual loading represents a significant time delay between balancing multiple rotors, which has significant cost implications for large-scale balancing, e.g. for the automotive industry.

SUMMARY

The present invention has been devised to address this long felt want to be able to fully automate the balancing process for a rotor without an operator having to load a rotor into the balance machine.

According to a first aspect of the invention, we provide an apparatus for transporting a rotor from a first location to a second location, including:

a holding device for engaging with a portion of the rotor at the first location so as to hold the rotor relative to the apparatus;

a position determination device for determining the position of at least one component part of the rotor relative to another component part of the rotor or another body;

a positioning device for positioning or repositioning said at least one component part of the rotor relative to another component part of the rotor or another body; and a movement device for moving the rotor from the first location to the second location.

According to a second aspect of the invention, we provide a method of loading a rotor into a balancing machine, the balancing machine including:

first and second mounting apparatus each for engaging with and holding respective ends of the rotor; and means for driving one or both the first and second mounting apparatus, wherein the method includes the steps of:

collecting a rotor from a first location using a transporting apparatus, the transporting apparatus including a holding device for engaging with a portion of the rotor so as to hold the rotor relative to the transporting apparatus;

determining the position of at least one component part of the rotor relative to another component part of the rotor or another body;

loading the rotor into the balancing machine; and engaging the first and second mounting apparatus of the balancing machine with respective end of the rotor, wherein, prior to or at the same time as the step of loading the rotor into the balancing machine, the method includes one or both of the steps of:

positioning or repositioning said at least one component part of the rotor relative to the another component part of the rotor or the another body; and/or positioning or repositioning one of the first and second mounting apparatus of the balancing machine at a desired position which corresponds to the position of the at least one component part of the rotor.

Further features of the first and second aspects of the invention as set out in dependent claims 2 to 20 appended hereto.

BRIEF DESCRIPTION OF THE DRAWINGS

Embodiments of the first and second aspects of the invention will be described by way of example only with reference to the accompanying drawings, of which.

DETAILED DESCRIPTION OF REPRESENTATIVE EMBODIMENTS

Referring firstly to FIGS. 1 to 4, these show side views of an apparatus 10 holding a rotor 80 which is to be loaded into a balancing machine 100. The apparatus 10 in this embodiment is configured for holding a three piece rotor 80 (which can be seen in more details in FIGS. 5 to 8, and will be described in more detail later).

The apparatus 10 includes a movement device in the form of a robotic arm having a fixed structure 12 which is fixed to, for example, a ground surface. Connected to the part 12 are two articulated arms 14, 16 which can pivot about axes 13, 15. Pivotally connected to a remote end of the arm 16 is a main body 20 to which is connected the working components which grasp and hold the rotor 80. As an alternative an automated "pick and place" device with one or more axes could be used separate or integral/attached to a balance machine.

These figures also show a balancing machine 100, which is well known in the art. The balancing machine 100 includes first 110 and second 120 mounting apparatus or chucks to engage with and hold the remote ends of the rotor 80. The machine 100 also has a pair of intermediate supports 130, 140 for supporting the central rotor part of the rotor 80. The chucks 110, 120 and intermediate supports 130, 140 are axially moveable towards and away from each other.

Figure 5:
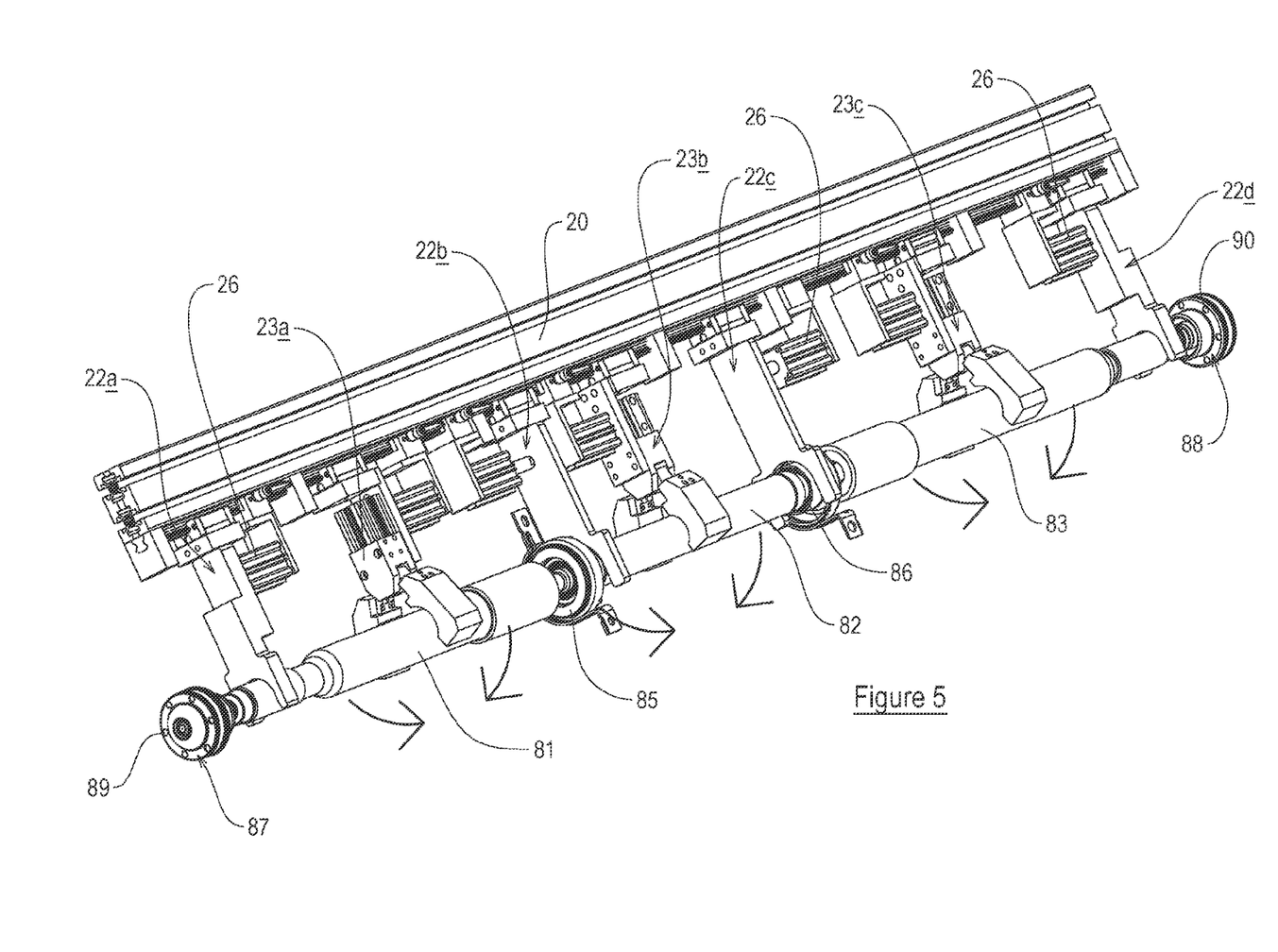
FIG. 5 is a perspective view of the apparatus of FIG. 1 in a re-loading condition.
Figure 6:
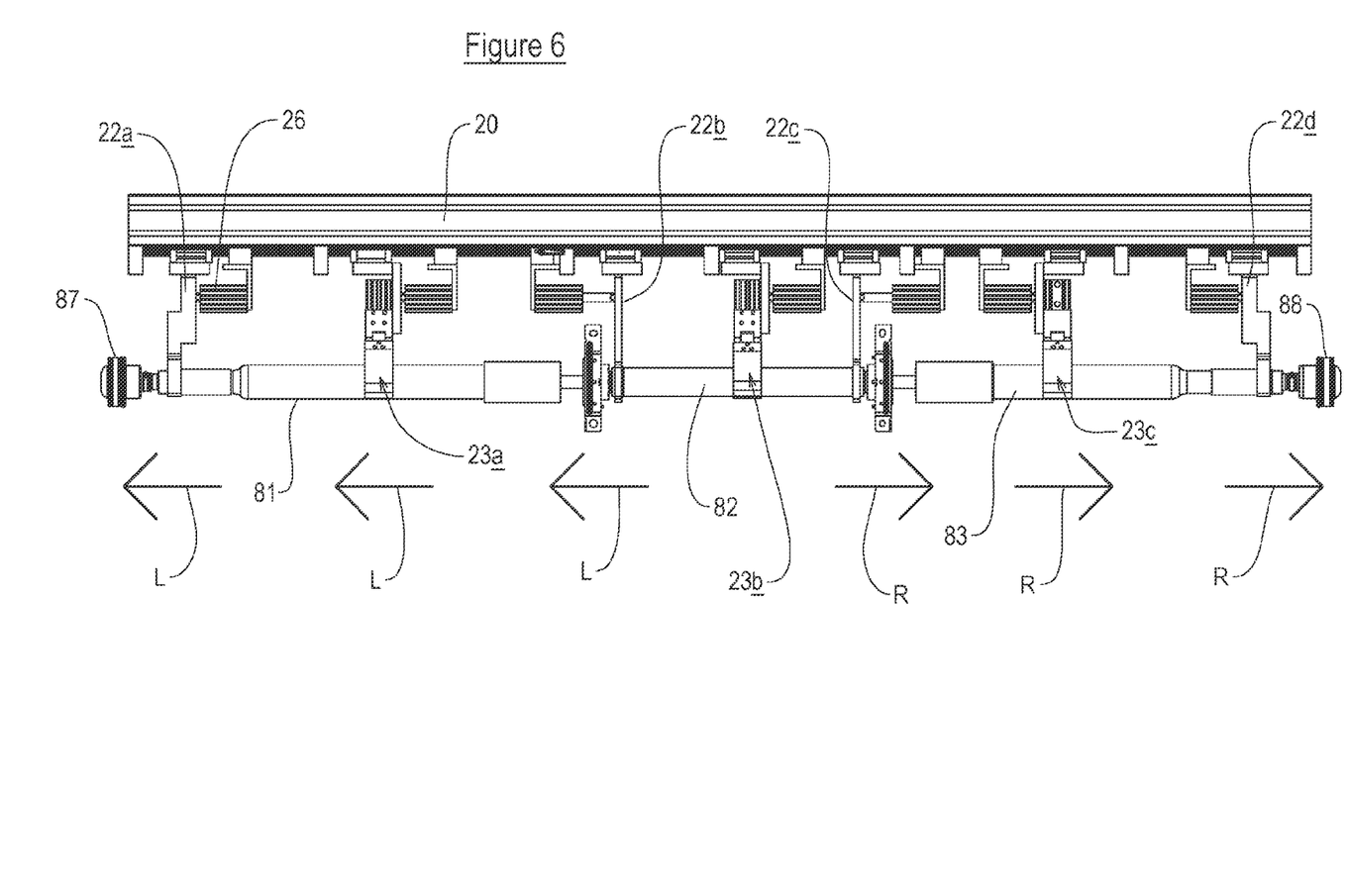
FIG. 6 is a side view corresponding to FIG. 5.

Referring particularly to FIG. 5, the rotor 80 in this example is a three piece rotor having three rotor portions 81, 82, 83. There is an articulating and plunging connection between rotor portion 81 and the central rotor portion 82 and 85 is a supporting bearing that articulates. There is also an articulating and plunging connection between rotor portion 83 and the central rotor portion 82 and 86 is a supporting bearing that articulates. A free end of the rotor portion 81 is provided with an articulating connection 87 with an array of apertures 89 therein. Likewise, a free end of the rotor portion 82 is provided with an articulating connection 88 with an array of apertures 90 therein. As is often the case, due to manufacturing techniques of the rotor 80, it is often the case that the apertures 89, 90 in the endmost articulated connections 87, 88 are not aligned with each other and differ from part to part, but as will become apparent, the present invention addresses and solves this issue when loading the rotor 80 into the machine 100.

The parts 87, 88 might typically be CV (constant velocity) joints, flanged joints, open universal joints, serrated flange joints, splined interface joints, rubber couplings, DOJs, slip yokes. In each case there is a location diameter or Pitch diameter that is located and held by a chuck (described later) so that balancing can be performed.

It should be appreciated that whilst in the present embodiment the apparatus 10 is configured for a three piece rotor, embodiments are envisaged which are suitable for two piece, one piece or where there are greater than three rotor portions. In such embodiments either the apparatus is specifically configured for such rotors, or is adjustable so as to cater for rotors with different numbers of rotor portions.

Referring particularly to FIGS. 5 to 8, the apparatus 10 is for transporting the rotor 80 from a first location (e.g. where the rotor is stored) to a second location at which the balancing machine is located. The apparatus 10 includes a plurality (three in this example although there could be fewer or more) holding devices 23a, 23b, 23c for engaging with the rotor portions 81, 82, 83 at the first location so as to grasp and hold the rotor 80 relative to the apparatus 10. In this example, each holding device 23a, 23b, 23c includes a pair of pivotally moveable engaging members 27a, 27b which are moveable towards and away from each other so as to hold the rotor portion 81, 82, 83 therebetween. As an alternative, one of the members 27a may be fixed, with the other member 27b moveable towards and away therefrom. The members 27a, 27b are operated by a pneumatic actuator, although a hydraulic or electro-mechanical actuator could be used.

Figure 7:
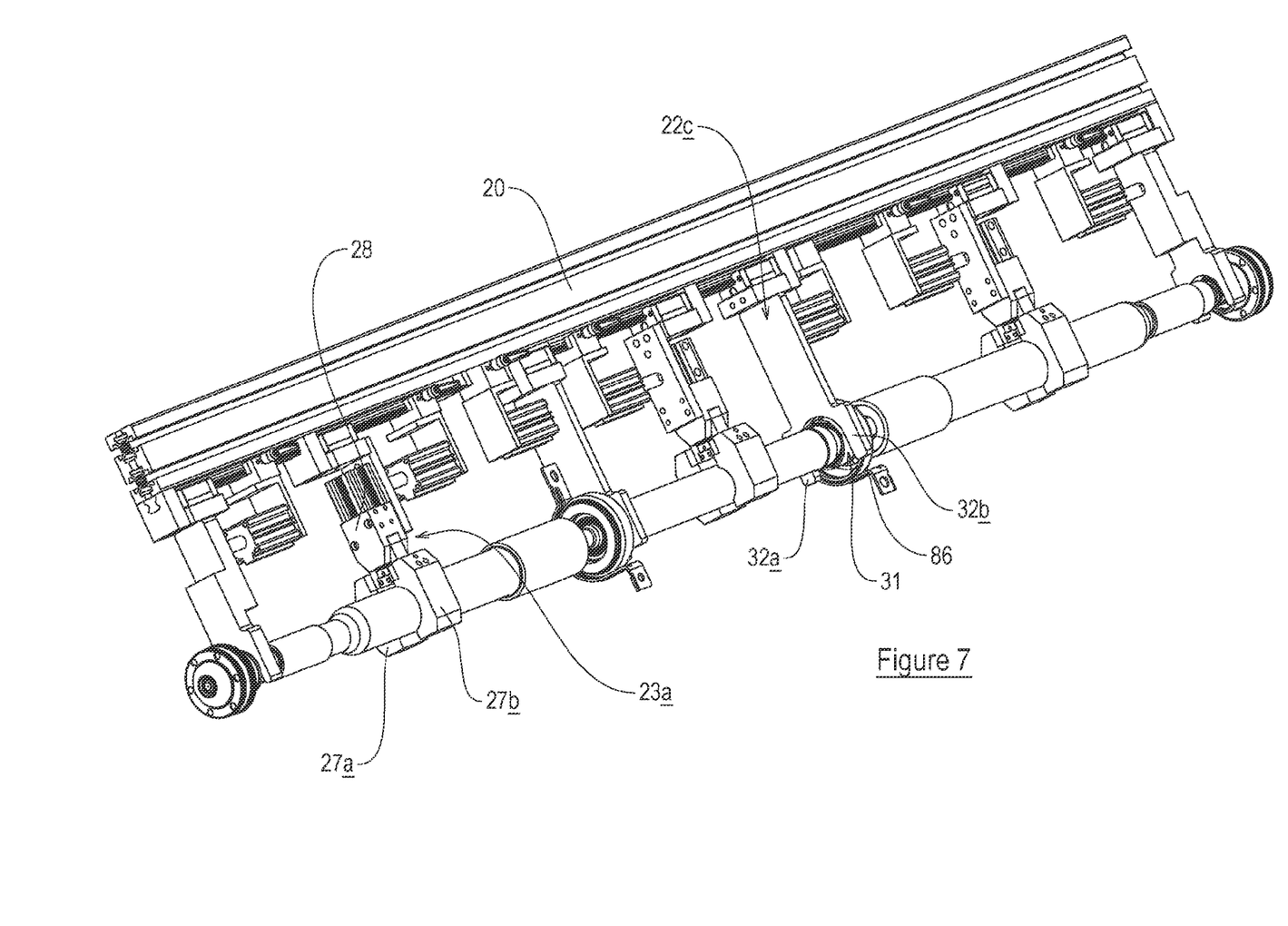
FIG. 7 is a perspective view of the apparatus of FIG. 1 in a loaded condition.
Figure 8:
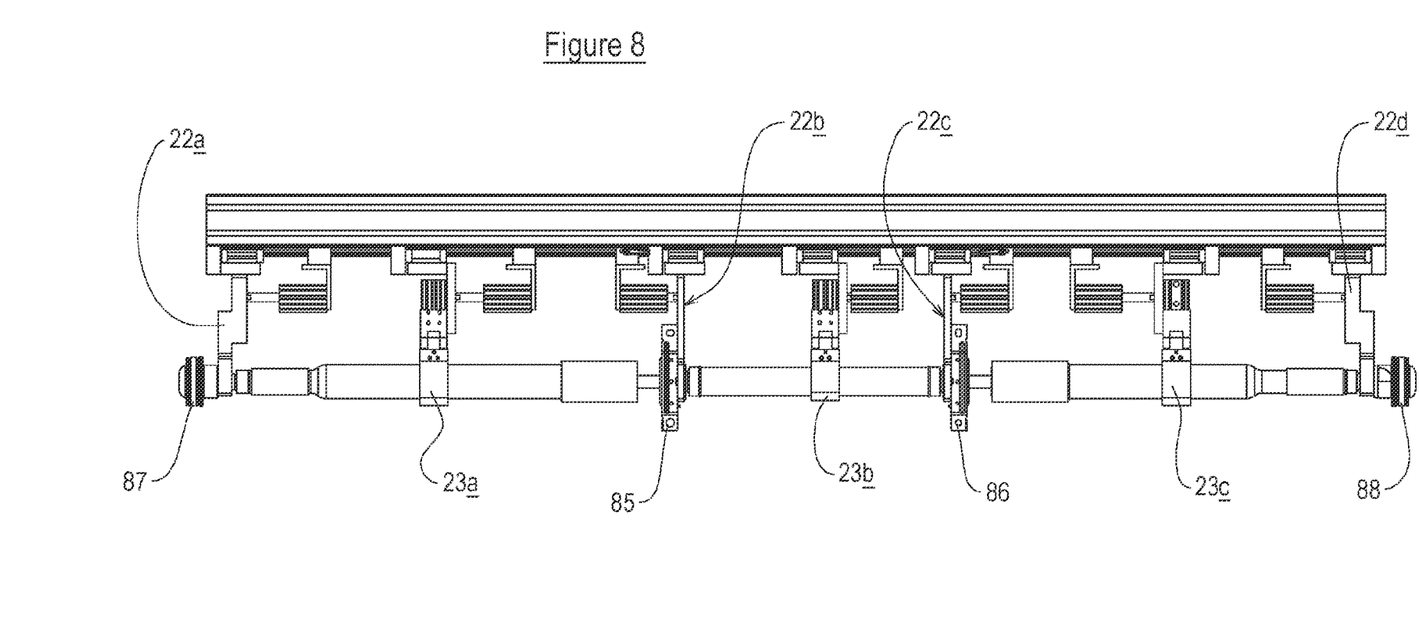
FIG. 8 is a side view corresponding to FIG. 7.

Referring particularly to FIG. 7, the apparatus 10 includes a plurality (four in this example although there could be fewer or more) of positioning devices 22a, 22b, 22c, 22d for engaging with the articulated parts 85, 86, 87, 88 of the rotor 80. The function of the positioning devices 22a, 22b, 22c, 22d is to position or reposition the articulated parts 85, 86, 87, 88 relative to an elongate axis of the rotor 80 so that they are substantially perpendicular thereto. In other words, the positioning devices 22a, 22b, 22c, 22d position or reposition the articulated parts 85, 86, 87, 88 so that they each lie in planes which are parallel to each other and perpendicular or substantially perpendicular to the elongate axis of the rotor 80. The positioning devices 22a, 22b, 22c, 22d are axially moveable in order to achieve this, which means that they can also account for any plunge in the parts 85, 86, 87, 88. In other words, the positioning devices can also be used to ensure that the articulated parts 85, 86, 87, 88 are spaced axially from each other at the required distance in order to be loaded into the balancing machine 100.

In more detail, each positioning device 85, 86, 87, 88 has a downwardly extending part which extends over the rotor substantially perpendicularly thereto. The part has an opening/recess 31 which opens downwardly and into which the rotor is received. Essentially, the part is n-shaped at its free end (so as to straddle the rotor). The axial position of each of the positioning devices 22a, 22b, 22c, 22d is controlled by a pneumatic actuator, with appropriate location feedback to a controller, as required, although a hydraulic or electromechanical actuator could be used. The actuator moves the positioning device 22a, 22b, 22c, 22d along a rail, or similar member, which extends parallel with the elongate rotor axis.

Whilst in the present embodiment the positioning devices 22a, 22b, 22c, 22d are configured for axially positioning or repositioning the component part of the rotor relative to another component part of the rotor or another body (e.g. a component part of a balancing machine or a main body of the apparatus), embodiments are envisaged where the same or additional positioning devices are configured for angularly positioning or repositioning a component of the rotor relative to another component part of the rotor or another body. In other words, the or a positioning device(s) may be capable of rotating a component part relative to another component part of the rotor or another body. They may, for example, be capable of rotating one or more articulated parts of the rotor or one or more elongate rotor portions of the rotor. Embodiments are envisaged where one or more of the holding devices 23a, 23b, 23c include means for rotating the rotor part which it holds, and/or means for axially displacing the rotor part it holds.

Figure 9:
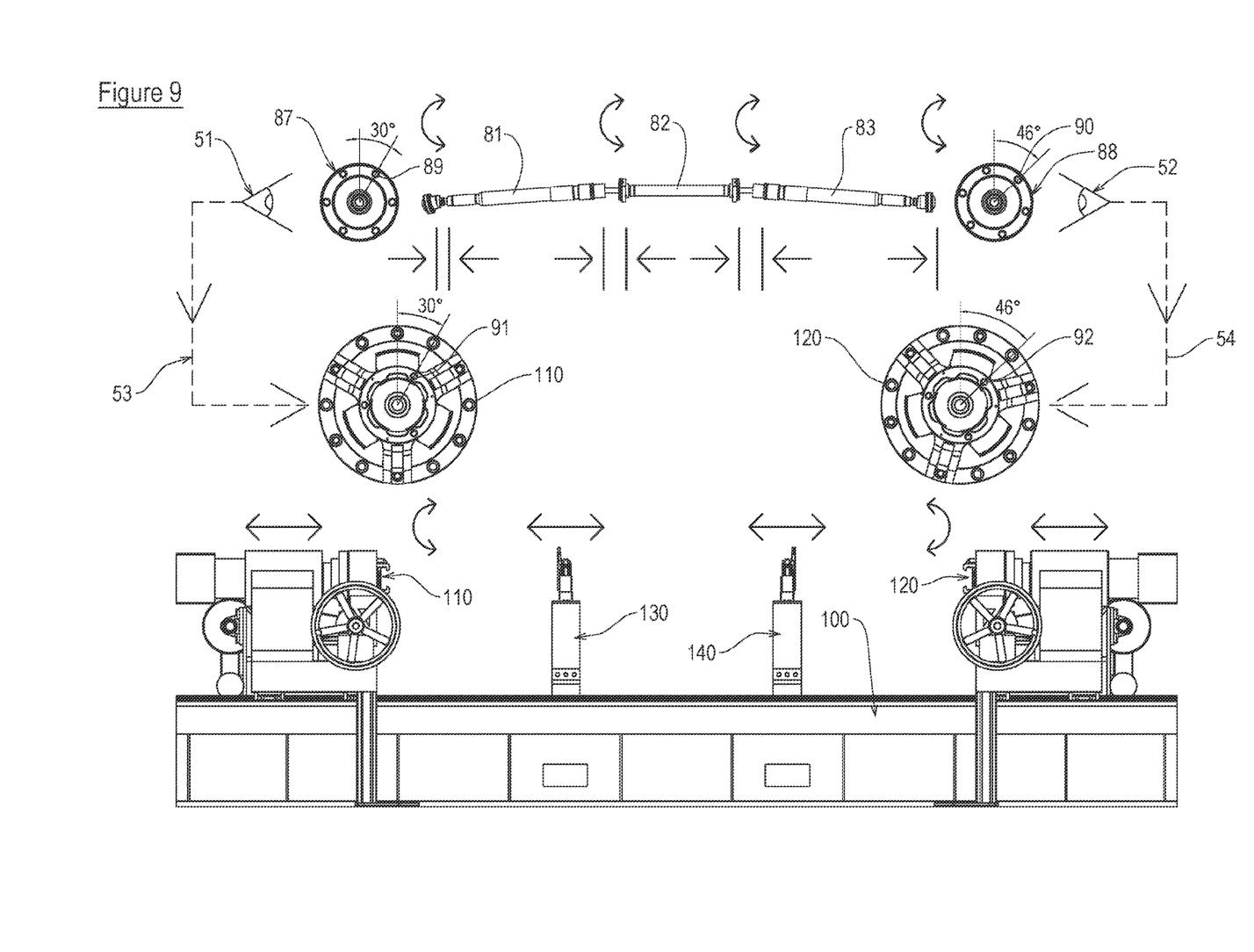
FIG. 9 is a set of schematic views to illustrate the operation of the apparatus of the present invention and the method of the present invention.

The apparatus 10 also includes two position determination devices 51, 52 (see FIG. 9). In short, the devices 51, 52 are for determining the position of at least one component part of the rotor relative to another component part of the rotor or another body. In this particular embodiment, each positioning device 51, 52 is for determining the position of the array of apertures 89, 90 in the endmost articulated parts 87, 88. In the present example, the devices 51, 52 are digital cameras, with suitable software, which can determine the angular position of each aperture 89, 90. A signal(s) representative of the said positions are either stored in a memory on the apparatus and/or sent to a central controller (the reason for which will become apparent later). Whilst in the present example there are two cameras 51, 52 (each for a respective end of the rotor 80), there could be one camera which is moveable (or the rotor end could be moved to a camera) to assess both ends of the rotor 80, or more than two cameras.

A method of loading the rotor 80 into the balancing machine 100 will now be described. The method includes the initial step of collecting the rotor 80 from a first location, which is remote from the balancing machine 100 (by remote we mean that the rotor is not already located on or in the balancing machine, but is positioned elsewhere—the rotor need not be positioned far from the machine). The rotor 80 may be supported on a surface or other suitable support(s) (e.g. a plurality of V-shaped support members, which would mean that the rotor portions 81, 82, 83 where closely coaxially aligned). The robotic arm then moves the main body 20 so that it is positioned directly above the rotor 80 (it could position the rotor laterally to one side of the machine). At this point, or before, the members 27a, 27b of each holding device 23a, 23b, 23c are moved away from each other so that they can be lowered over the rotor 80. The positioning devices 22a, 22b, 22c, 22d are also moved to desired axial positions which ensure that they will not foul the articulated pats 85, 86, 87, 88.

The robotic arm then lowers the main body until the rotor portions 81, 82, 83 are received in between the members 27a, 27b of each holding device 23a, 23b, 23c. The members 27a, 27b of each holding device 23a, 23b, 23c are then moved towards each other until they engage and sufficiently grasp the rotor portions 81, 82, 83 (the holding devices 23a, 23b, 23c may include force feedback sensors to ensure the part is clamped and/or also to ensure that the members 27a, 27b do not apply too much force to the rotor portions 81, 82, 83).

In this particular example, the robotic arm then raises the main body 20 and the rotor 80 from the surface or support. Prior to this or at the same time the positioning devices 22a, 22b, 22c, 22d are moved to desired axial positions so as to engage the articulated parts 85, 86, 87, 88 and hold those parts in the desired axial positions relative to each other. The positioning devices 22a, 22b, 22c, 22d also hold the articulated parts 85, 86, 87, 88 perpendicular with the elongate axis of the rotor 80. This ensures that the parts 85, 86, 87, 88 can easily be engaged with the chucks 110, 120 and intermediate supports 130, 140 of the balancing machine 100.

Prior to or at the same time as the rotor 80 is being moved towards the balancing machine 100 (or indeed before loading of articulated endmost parts 87, 88 in to the chucks 110,120) the cameras 51, 52 determine the position of the array of apertures 89, 90 in the endmost articulated parts 87, 88. Details of said aperture positions are then transmitted to the balancing machine 100, which rotates its chucks 110, 120 so that projections 91, 92 thereon are rotationally aligned with the apertures 89, 90 (when the rotor is eventually loaded). The angular position of each chuck 110, 120 is always known as the spindles which drive them have encoders that are connected to the balance machine's electronic control system.

Figure 1:
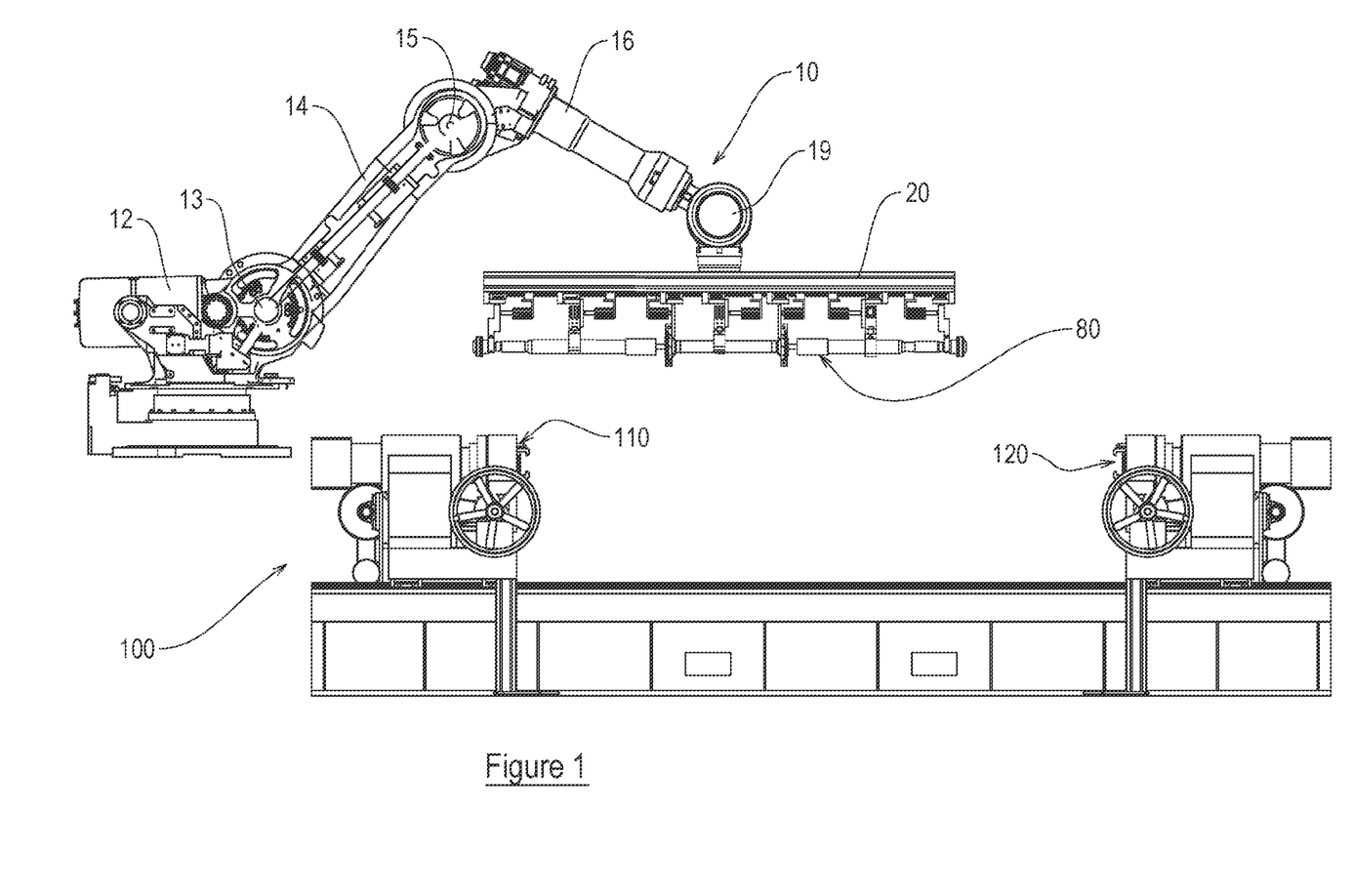
FIG. 1 is a side view of an apparatus in accordance with the present invention holding a rotor which is to be loaded into a balancing machine.
Figure 2:
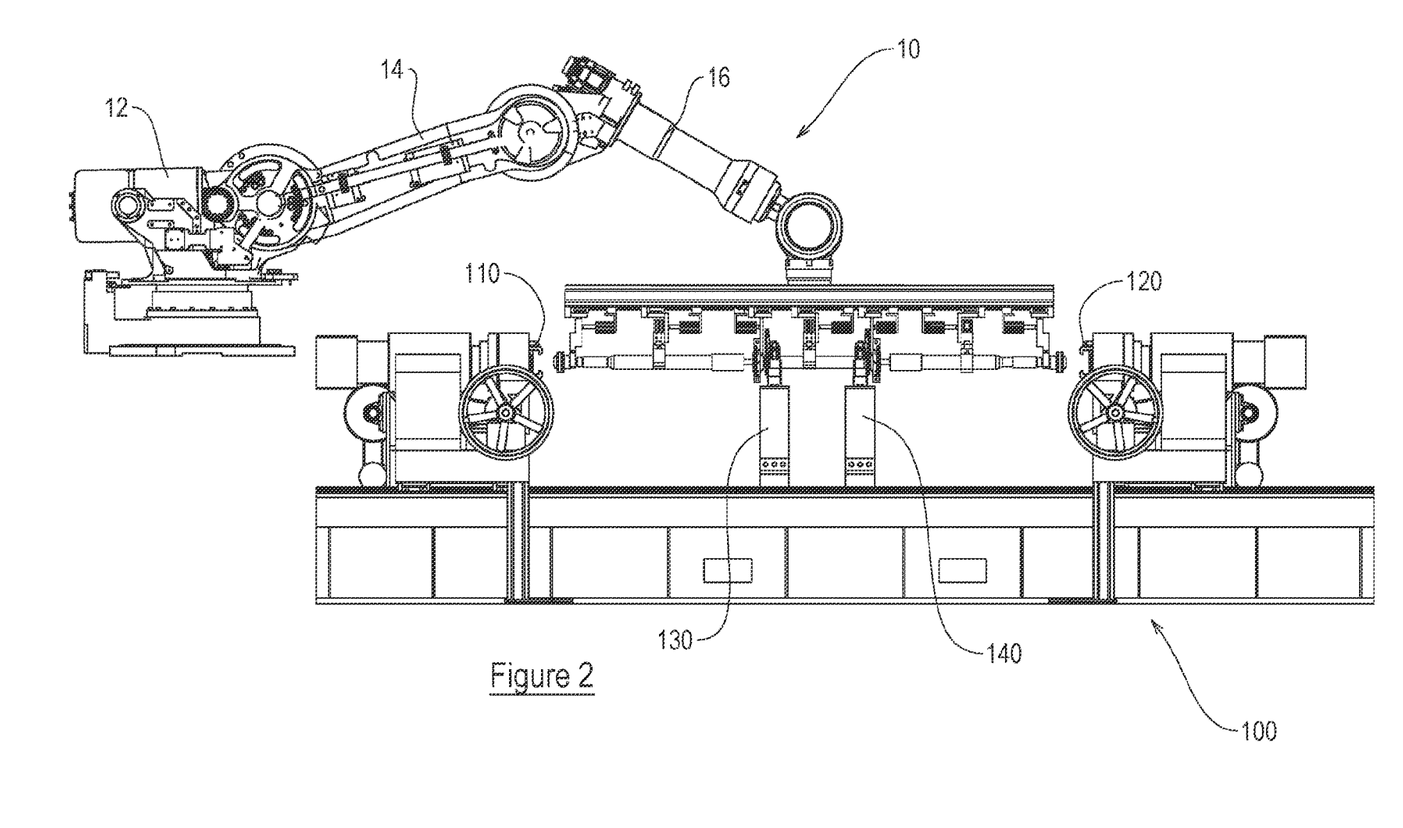
FIG. 2 is a side view of the apparatus of FIG. 1 with the rotor partially loaded into the balancing machine.
Figure 3:
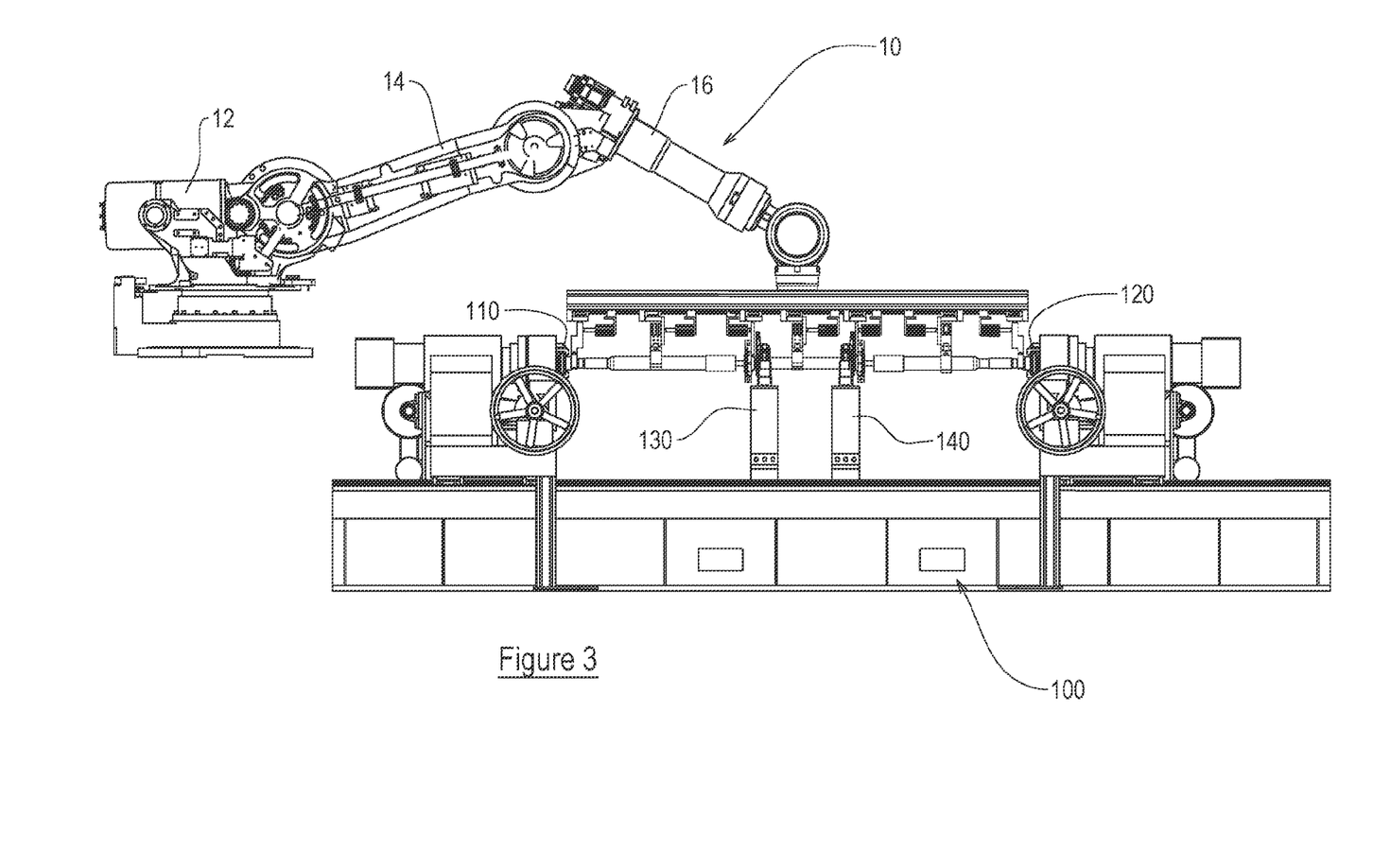
FIG. 3 is a side view of the apparatus of FIG. 1 with the rotor fully loaded into the balancing machine.
Figure 4:
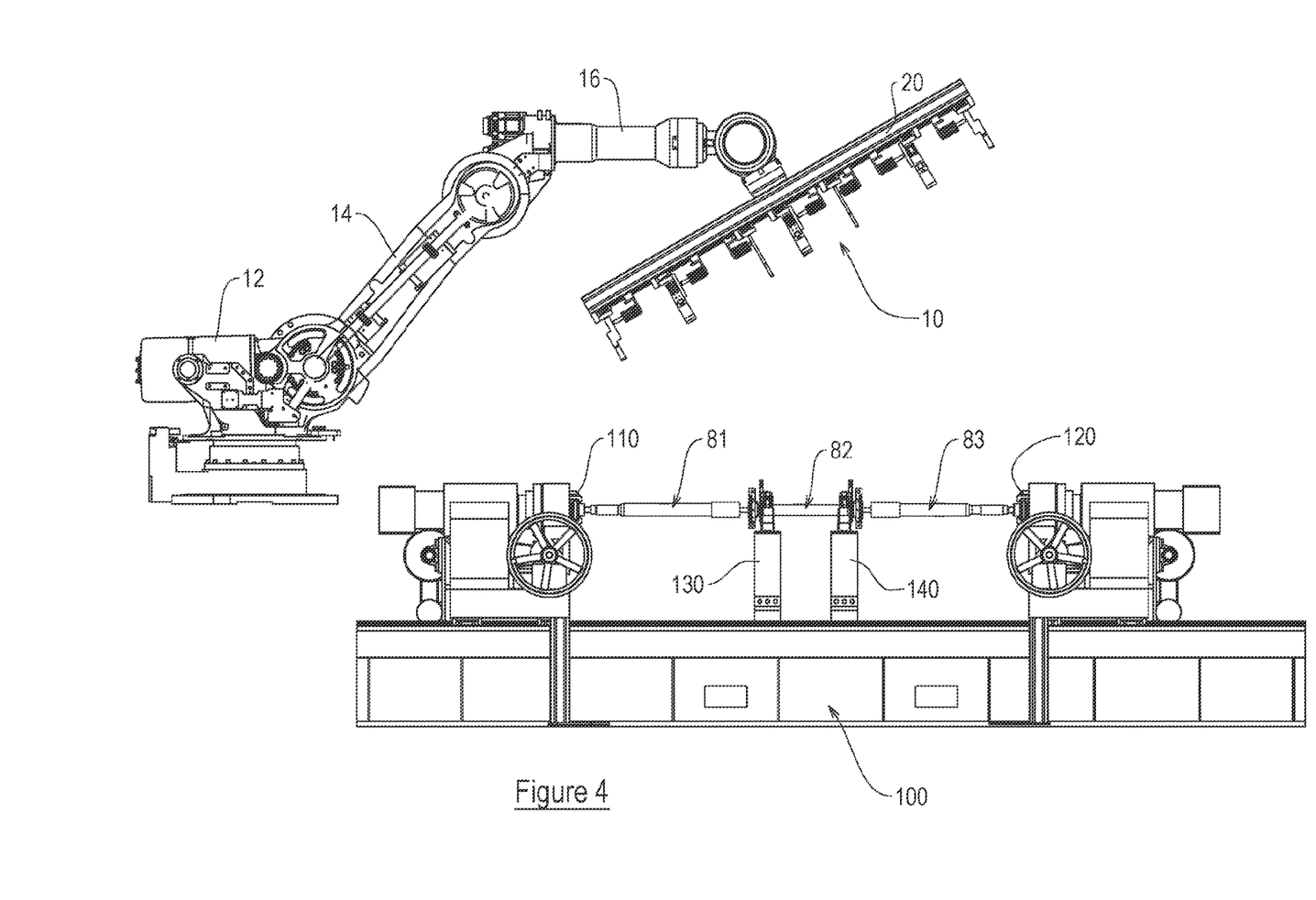
FIG. 4 is a side view of the apparatus of FIG. 1 with the rotor fully loaded into the balancing machine and the apparatus being moved back to a first location.

The rotor 80 is then lowered into the balancing machine 100 (see FIGS. 1 and 2). The chucks 110, 120 are then moved axially towards each other until they engage and then grasp the ends of the rotor 80 (see FIG. 3), and the intermediate supports are caused to grasp or support the articulated parts 85, 86. The members 27a, 27b of the holding devices 23a, 23b, 23c are then moved away from each other so as to release the rotor portions 81, 82, 83. At the same time, before, or shortly after, the positioning devices 22a, 22b, 22c, 22d are moved slightly away from the parts of the rotor 80 with which they were engaged. The robotic arm then raises the main body away from the balancing machine 100 (see FIG. 4), where it is then moved back to the first location to collect another rotor for balancing.

The balancing machine 100 is then use to balance the rotor 80 as is well known in the art.

As an alternative, instead of the balancing machine 100 receiving signals from both cameras 51, 52 and then rotating the chucks 110, 120 accordingly, the balancing machine 100 may rotate the chuck 110 so as to align its projections 91 with the apertures 89 of the part 97. The rotor 80 may then be loaded into the machine 100 and the chuck 110 moved axially towards the part 87 until it is fully engaged therewith. The chuck 110 may then effect rotation of the rotor 80 until the apertures 90 of the part 88 are aligned with the projections 92 of the second chuck 120. The second chuck 120 may then be moved axially towards the part 88 (or the chuck 110 and rotor 80 may be moved axially towards the chuck 120) until it is fully engaged therewith. Once this has been achieved, the holding devices 23a, 23b, 23d and positioning devices 22a, 22b, 22c, 22d release the rotor 80 and the main body 20 is moved away from the balancing machine to allow the balancing process to take place. As will be appreciated, in order to permit such a system to operate, the holding devices 23a, 23b, 23c must be configured for permitting the rotor portions 81, 82, 83 to rotate where required. As a further alternative, the rotor may first be engaged with a fixed chuck, and the rotated by that chuck, and then other chuck moved into engagement with the other endmost part of the rotor (i.e. the rotor is not moved axially).

As a further alternative, the rotor 80 may be rotated not by the chuck 110, but by a suitable mechanism on the apparatus 10. For example, one or more of the holding devices 23a, 23b, 23c may be configured for rotating the rotor the desired amount so as to align the apertures 90 of the part 88 with the projections 92 of the chuck 120.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A transporting apparatus for transporting an elongate rotor from a first location to a balancing machine at a second location, the rotor being rotatable about an elongate axis and having first and second moveable component parts which are moveable relative to each other, the transporting apparatus including:
   a first holding device capable of engaging with a portion of the rotor at the first location so as to hold the rotor relative to the transporting apparatus;
   a second holding device capable of engaging with a further portion of the rotor at the first location so as to hold the rotor relative to the transporting apparatus;
   a position determination device capable of determining the position of the first moveable component part of the rotor relative to the second moveable component part of the rotor or relative to a mounting apparatus of the balancing machine into which the elongate rotor may be loaded;
   a positioning device capable of positioning the first moveable component part of the rotor relative to the second moveable component part of the rotor or relative to the mounting apparatus of the balancing machine into which the elongate rotor may be loaded; and
   a movement device for moving the rotor from the first location to the second location.

2. A transporting apparatus according to claim 1 including a second position determination device capable of determining the position of the second moveable component part relative to the first moveable component part or relative to a mounting apparatus of the balancing machine into which the elongate rotor may be loaded.

3. A transporting apparatus according to claim 1 including a second positioning device capable of positioning the second moveable component part of the rotor relative to the first moveable component part of the rotor or relative to the mounting apparatus of the balancing machine into which the elongate rotor may be loaded.

4. An apparatus according to claim 1 wherein the positioning device is capable of angularly positioning, or rotating, the first moveable component part of the rotor relative to the second moveable component part of the rotor or relative to the mounting apparatus of the balancing machine into which the elongate rotor may be loaded.

5. An apparatus according to claim 1 wherein the positioning device is capable of:
   engaging with and holding the first moveable component part of the rotor in a desired axial position relative to the second moveable component part of the rotor or relative to the mounting apparatus of the balancing machine into which the elongate rotor may be loaded; and/or
   engaging with and holding the first moveable component part of the rotor such that it lies in a plane perpendicular or substantially perpendicular to an elongate axis of the rotor.

6. An apparatus according to claim 5 where the positioning device is capable of axially displacing the first moveable component part relative to the second moveable component part of the rotor or relative to the mounting apparatus of the balancing machine into which the elongate rotor may be loaded.

7. An apparatus according to claim 1 wherein the positioning device is capable of positioning an endmost articulated part of the rotor relative to the first and/or second moveable component part(s) of the rotor or relative to the mounting apparatus of the balancing machine into which the elongate rotor may be loaded.

8. An apparatus according to claim 1 wherein the first holding device is capable of engaging with and holding the first moveable component part of the rotor in a desired axial position relative to the second moveable component part of the rotor or relative to the mounting apparatus of the balancing machine into which the elongate rotor may be loaded; and/or
   wherein the second holding device is capable of engaging with and holding the second moveable component part of the rotor in a desired axial position relative to the first moveable component part of the rotor or relative to the mounting apparatus of the balancing machine into which the elongate rotor may be loaded.

9. An apparatus according to claim 1 wherein the first holding device is capable of engaging with and holding the first moveable component part of the rotor such that it lies in a plane perpendicular or substantially perpendicular to an elongate axis of the rotor; and/or
   wherein the second holding device is capable of engaging with and holding the second moveable component part of the rotor such that it lies in a plane perpendicular or substantially perpendicular to an elongate axis of the rotor.

10. An apparatus according to claim 1 wherein the first holding device is capable of angularly positioning, or rotating, the first moveable component part of the rotor relative to the second moveable component part of the rotor or relative to the mounting apparatus of the balancing machine into which the elongate rotor may be loaded; and/or
    wherein the second holding device is capable of angularly positioning, or rotating, the second moveable component part of the rotor relative to the first moveable component part of the rotor or relative to the mounting apparatus of the balancing machine into which the elongate rotor may be loaded.

11. An apparatus according to claim 1 wherein the first and/or second moveable component part of the rotor is a generally elongate part thereof, and an articulated part of the rotor.

12. An apparatus according to claim 1 wherein the first and/or second moveable component part of the rotor is an endmost, or articulated endmost, part of the rotor.

13. An apparatus according to claim 1 wherein the first and/or second moveable component part of the rotor is an intermediate, or intermediate articulated, part of the rotor.

14. An apparatus according to claim 1 wherein the positioning device includes a controller and a location feedback sensor operatively linked to the controller to control movement of the positioning device relative to a rotor being transported.

15. A system including:
a transporting apparatus according to claim 1; and
a balancing machine including:
a first mounting apparatus capable of engaging with and holding a first respective end of the rotor;
a second mounting apparatus capable of engaging with and holding a second respective end of the rotor; and
a motor for driving one or both of the first and second mounting apparatus;
wherein the transporting apparatus and the balancing machine are arranged such that the transporting apparatus is capable of transporting a rotor from a first location to the balancing machine at the second location to be loaded into the balancing machine.

16. A method of loading an elongate rotor into a balancing machine using a system as claimed in claim 15, the method including the steps of:
collecting a rotor from a first location using the transporting apparatus, the first and second holding devices of the transporting apparatus engaging with a portion of the rotor so as to hold the rotor relative to the transporting apparatus;
determining the position of the first moveable component part of the rotor relative to the second moveable component part of the rotor or relative to the first or second mounting apparatus of the balancing machine;
loading the rotor into the balancing machine; and
engaging the first and second mounting apparatus of the balancing machine with each respective end of the rotor,
wherein, prior to or at the same time as the step of loading the rotor into the balancing machine, the method includes one or both of the steps of:
positioning the first moveable component part of the rotor relative to the second moveable component part of the rotor or relative to the first or second mounting apparatus; and/or
positioning one of the first and second mounting apparatus of the balancing machine at a desired position which corresponds to the position of the first moveable component part of the rotor.

17. A method according to claim 16 including the steps of:
determining the position of the first moveable component part of the rotor relative to the second moveable component part of the rotor or relative to the first mounting apparatus of the balancing machine;
determining the position of the second moveable component part of the rotor relative to the first moveable component part of the rotor or relative to the second mounting apparatus of the balancing machine;
and wherein, prior to or at the same time as the step of loading the rotor into the balancing machine, the method includes one or more or all of the following steps:
positioning the first moveable component part of the rotor relative to the second moveable component part of the rotor or relative to the first mounting apparatus of the balancing machine;
positioning the second moveable component part of the rotor relative to the first moveable component part of the rotor or relative to the second mounting apparatus of the balancing machine;
positioning the first mounting apparatus of the balancing machine at a desired position which corresponds to the position of the first moveable component part of the rotor; and/or
positioning the second mounting apparatus of the balancing machine at a desired position which corresponds to the position of the second moveable component part of the rotor.

18. A method according to claim 16 wherein the first moveable component part of the rotor is an endmost part thereof and/or wherein the second moveable component part of the rotor is an endmost part thereof.

19. A method according to claim 18 wherein the method includes the steps of:
determining the position of an array of apertures in the first endmost part of the rotor; and
aligning the first mounting apparatus with the apertures in the first endmost part of the rotor so that the first mounting apparatus may engage with the first endmost part of the rotor; and/or
determining the position of an array of apertures in the second endmost part of the rotor; and
aligning the second mounting apparatus with the apertures in the second endmost part of the rotor so that the second mounting apparatus may engage with the second endmost part of the rotor.

20. A method according to claim 16 wherein the method includes the steps of:
determining the position of a first endmost part of the rotor;
determining the position of a second, opposite, endmost part of the rotor;
positioning the first mounting apparatus of the balancing machine at a desired position which corresponds to the position of the first endmost part of the rotor;
loading the rotor into the balancing machine;
engaging the first mounting apparatus of the balancing machine with the first endmost part of the rotor;
rotating the rotor until the second endmost part of the rotor is aligned with the second mounting apparatus; and
engaging the second mounting apparatus of the balancing machine with the second endmost part of the rotor.

* * * * *